W. F. McCARTY.
BORING MACHINE.
APPLICATION FILED DEC. 16, 1919.

1,392,778.

Patented Oct. 4, 1921.

WITNESSES

INVENTOR
William F. McCarty
BY
ATTORNEYS

W. F. McCARTY.
BORING MACHINE.
APPLICATION FILED DEC. 16, 1919.

1,392,778.

Patented Oct. 4, 1921.
9 SHEETS—SHEET 6.

WITNESSES

INVENTOR
William F. McCarty
BY
ATTORNEYS

W. F. McCARTY.
BORING MACHINE.
APPLICATION FILED DEC. 16, 1919.

1,392,778.

Patented Oct. 4, 1921.
9 SHEETS—SHEET 8.

Fig. 14.

WITNESSES

INVENTOR
William F. McCarty
BY
ATTORNEYS

UNITED STATES PATENT OFFICE.

WILLIAM F. McCARTY, OF DEFIANCE, OHIO, ASSIGNOR TO DEFIANCE MACHINE WORKS, OF DEFIANCE, OHIO, A CORPORATION OF OHIO.

BORING-MACHINE.

1,392,778.  Specification of Letters Patent.  Patented Oct. 4, 1921.

Application filed December 16, 1919. Serial No. 345,239.

*To all whom it may concern:*

Be it known that I, WILLIAM F. McCARTY, a citizen of the United States, and a resident of Defiance, in the county of Defiance and State of Ohio, have invented a new and Improved Boring-Machine, of which the following is a full, clear, and exact description.

The invention relates to high speed metal working machine tools, and its object is to provide a new and improved boring machine more especially designed to quickly and accurately rough bore and ream or finish single units or a plurality of units cast *en bloc*.

Another object is to carry out the several boring operations simultaneously on a corresponding number of castings while the attendant of the machine removes the finished product and replaces it by another casting to be bored.

Another object is to provide a smooth and powerful drive for the boring spindles at the same time reducing the torque to a minimum and eliminating chatter in the cutting tools.

Another object is to bore the units at a high rate of production, absolutely true, diametrical and in vertical alinement one relative to the other.

Another object is to automatically control the feeding of the work holder to and from the boring tools.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

General construction.

Figure 3:
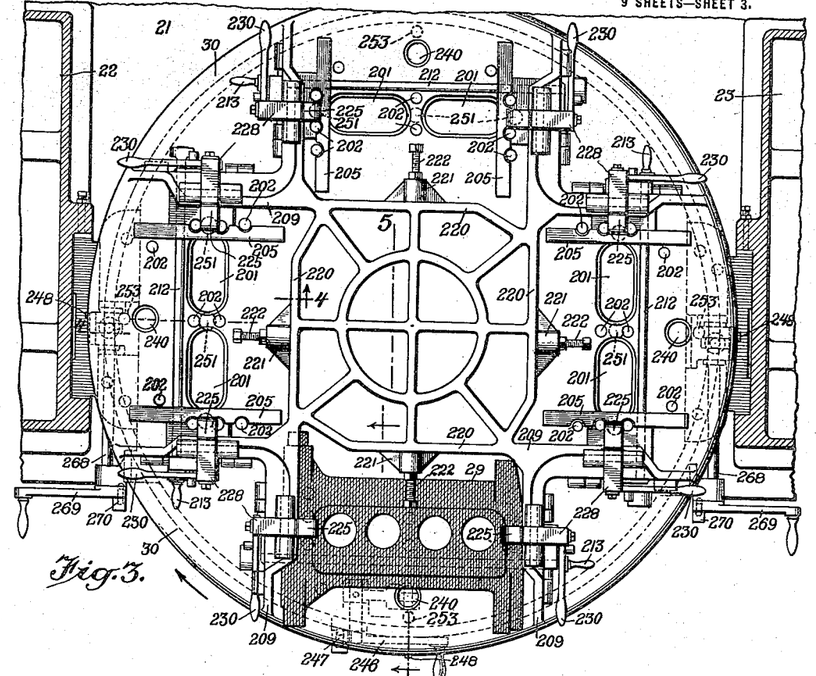
Fig. 3 is an enlarged sectional plan view of the same on the line 3—3 of Fig. 2.
Figure 5:
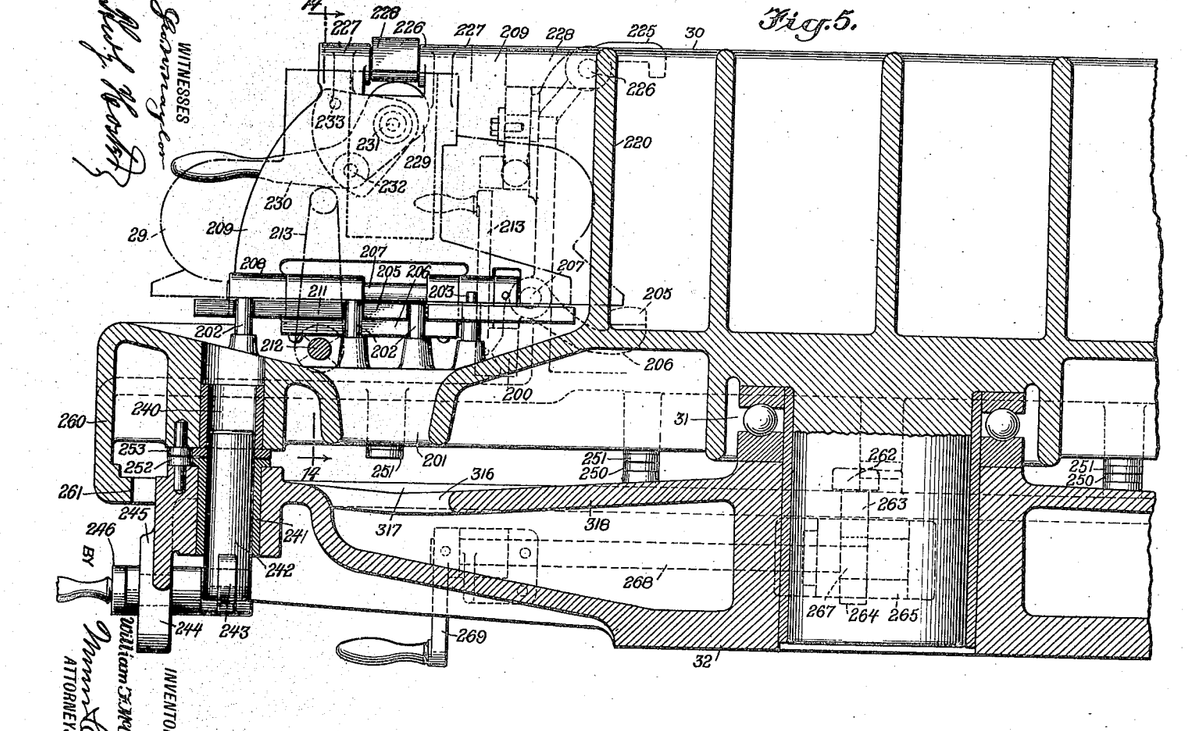
Fig. 5 is an enlarged cross section of the table and work holder, the section being on the line 5—5 of Fig. 3.

The boring machine is mounted on a suitably constructed main frame 20 comprising a base 21, standards 22, 23 attached to the base 21 and connected with each other at their upper ends by a spindle head 24 in which are journaled two sets of oppositely disposed spindles 25 and 26 carrying boring tools 27 and 28, of which the boring tools 27 are adapted to rough bore a plurality of engine cylinders while the boring tools 28 are designed for reaming or finishing the rough bored engine cylinders. The engine cylinders are shown in Fig. 3 cast *en bloc* on a single casting 29 held on an indexing work holder 30 mounted on its bottom on a centrally arranged ball bearing 31 (see Fig. 5) held centrally on a table 32 bolted or otherwise fastened on a support or bed 33 mounted to slide up and down in suitable guideways 34 arranged on the standards 22, 23 of the main frame 20.

Spindle drive.

Figure 1:
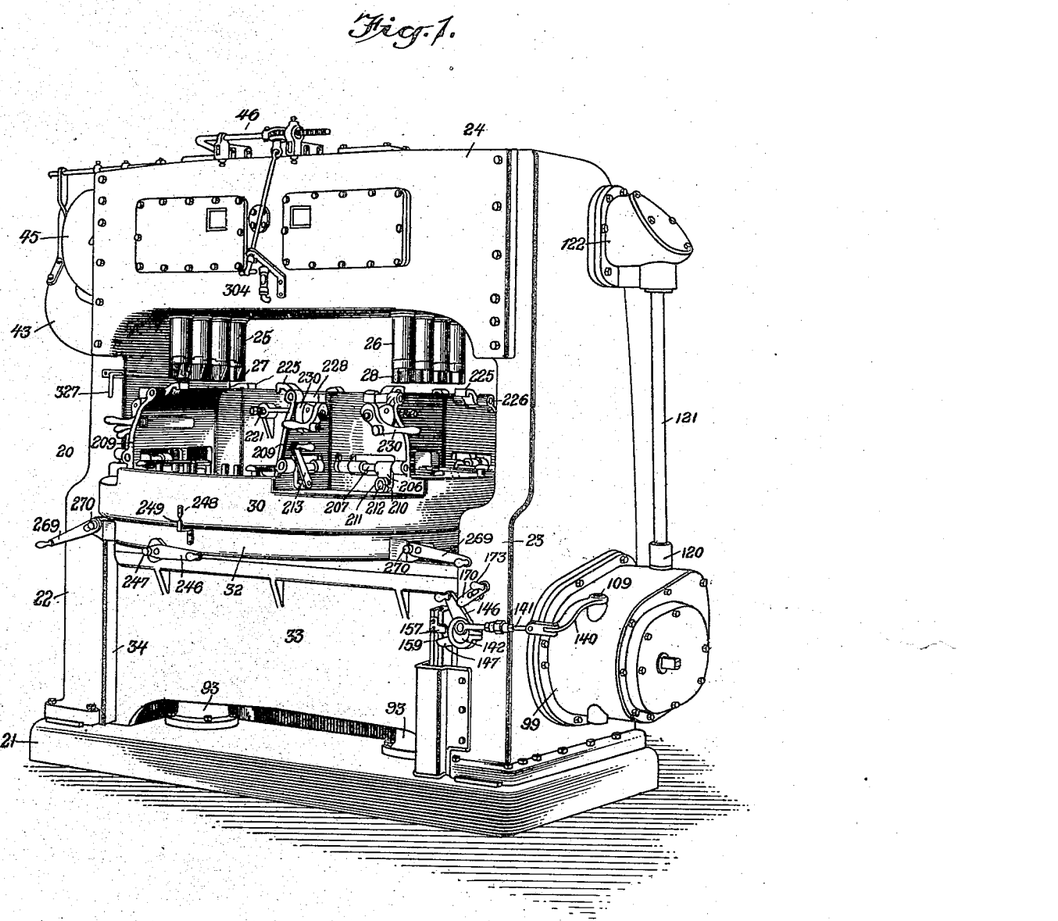
Figure 1 is a perspective view of the improved boring machine more especially designed for boring a number of internal combustion engine cylinders cast *en bloc;*
Figure 2:
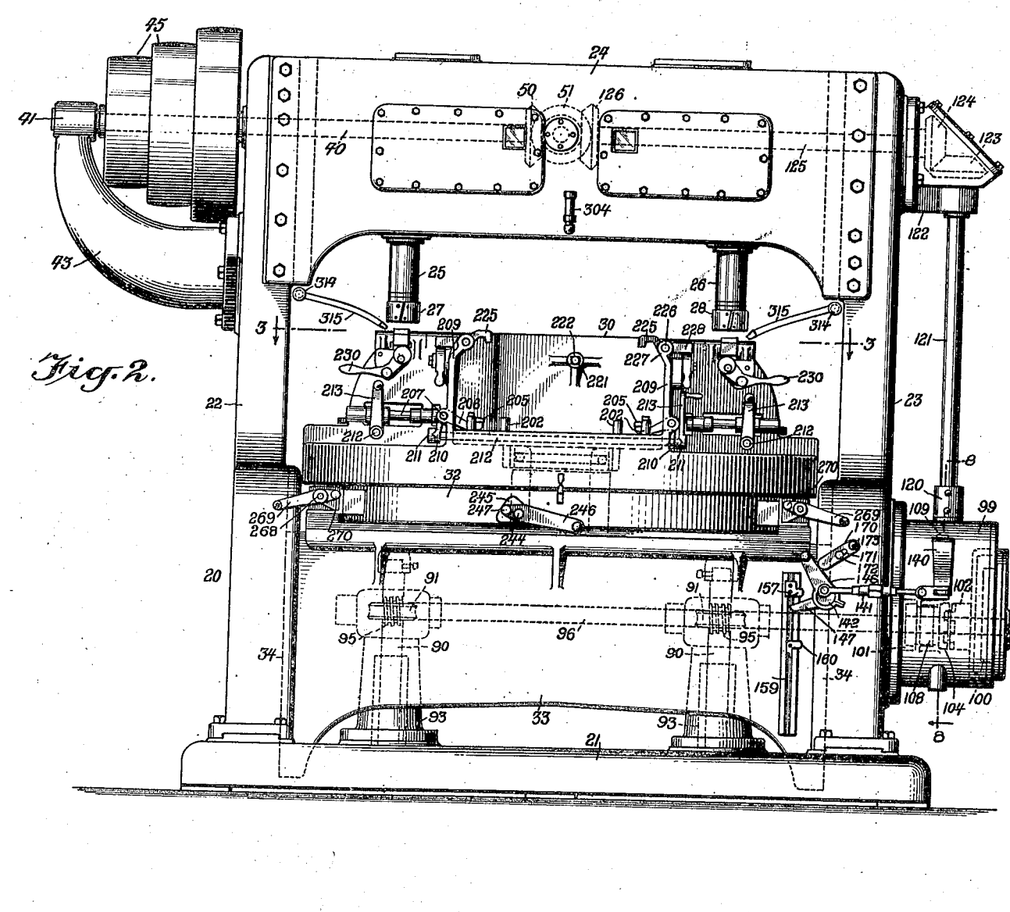
Fig. 2 is a front elevation of the same.
Figure 6:
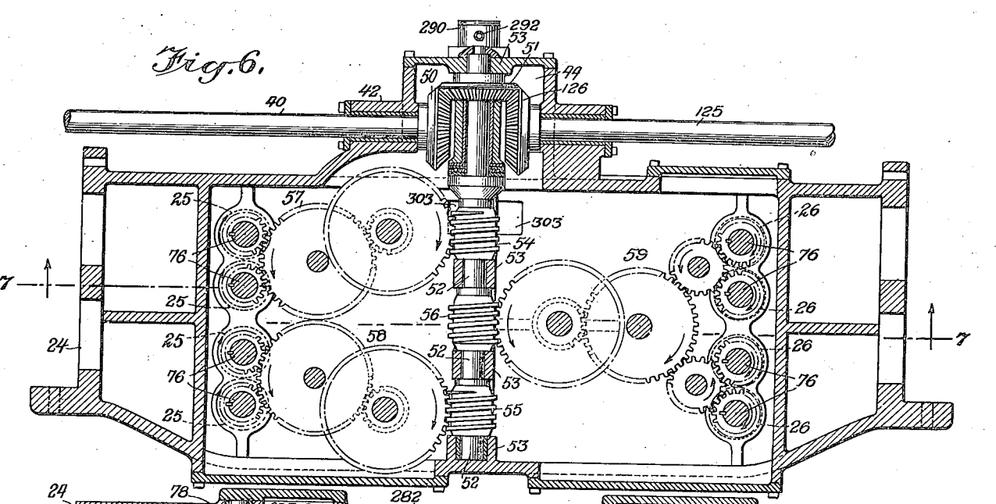
Fig. 6 is an enlarged inverted sectional plan view of the spindle head, spindles and driving mechanism for the same, the section being on the line 6—6 of Fig. 7.

The spindles 25 and 26 are rotated in unison from the main shaft 40 journaled in suitable bearings 41 and 42 (see Figs. 2 and 6), of which the bearing 41 is arranged on a bracket 43 secured to the standard 22, and the bearing 42 is arranged on a housing 44 forming part of the spindle head 24 and arranged on the back thereof, as plainly shown in Fig. 6. On the main shaft 40 is secured a step or cone pulley 45 connected by belt with other machinery for rotating the main driving shaft 40 at a desired speed and according to the step of the pulley 45 engaged by the driving belt at the time. A suitable belt shifter 46 is mounted on the head 24 and is under the control of the operator standing in front of the machine to shift the belt on the cone pulley 45 whenever it is desired to do so. On the inner end of the main shaft 40 is secured a bevel gear wheel 50 in mesh with the bevel gear wheel 51 secured on a transversely extending shaft 52 journaled in suitable bearings 53 arranged in a spindle head 24. On the shaft 52 are secured three worms 54, 55 and 56, of which the worms 54 and 55 are connected by trains of gear wheels 57 and 58 with the spindles 25 for rotating the same at a like speed and in the same direction as indicated by arrows in Fig. 6. The other worm 56 is connected by a train of gear wheels 59 with the spindles 26 to rotate the same in unison in the same direction and at the same speed as the spindles 25. The gear wheels forming the train of gear wheels 59 are preferably of the helical or herring bone type to eliminate chatter. In order to prevent undesirable torque and chatter in the boring tools 25, 28, each of the spindles 25 is journaled in a bearing 75 arranged in the lower portion of the spindle head 24, and each spindle is provided with a top extension 76 journaled in bearings 77 and 78 mounted in the middle and upper portions of the spindle head 24 to insure true running of each spindle and thus prevent torque and eliminate chatter. Suitable thrust bearings 79 and 80 are provided for the spindles 25 and their extensions 76 to reduce end thrusts to a minimum and to eliminate friction.

Support raising and lowering device.

Figure 14:
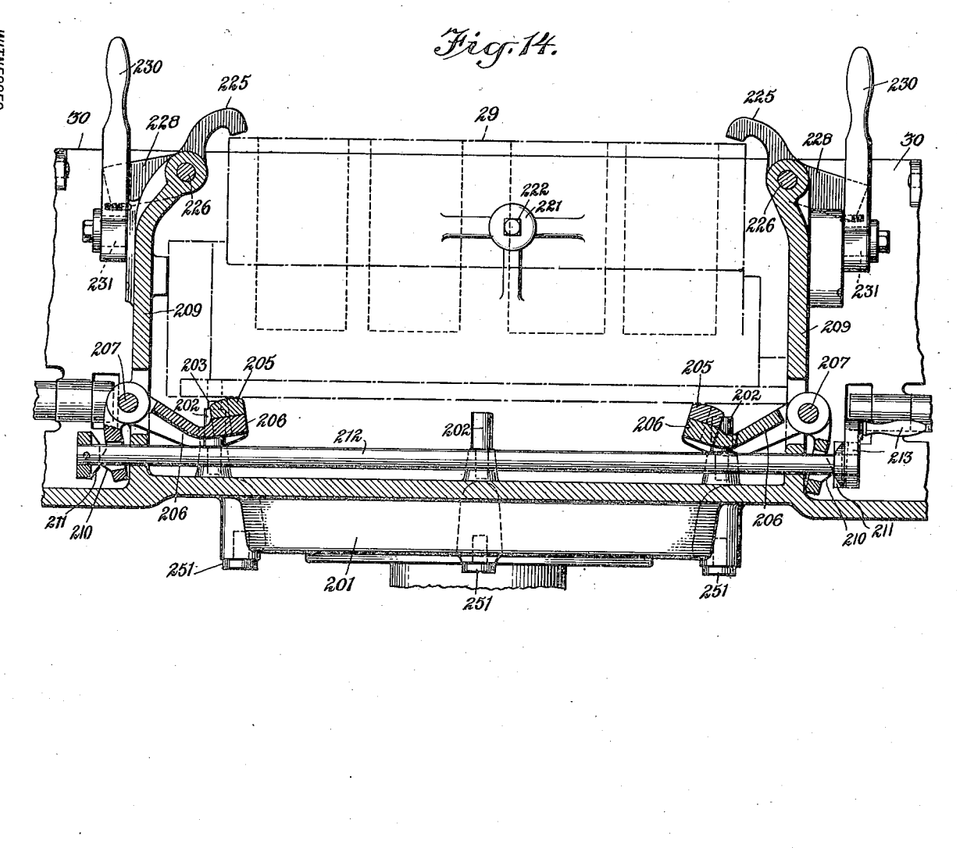
Fig. 14 is an enlarged sectional side elevation of a portion of the work holder on the line 14—14 of Fig. 5, and showing more particularly the means for receiving and temporarily supporting the work prior to lowering it onto a permanent rest.

The support 33 is attached to the upper ends of two jackscrews 90 (see Figs. 2 and 14) on which are screw worm wheels 91 mounted to rotate in suitable bearings 92 arranged on columns 93 attached to the base 21 of the main frame 20. The worm wheels 91 are in mesh with worms 95 secured on a longitudinally extending shaft 96 journaled in suitable bearings arranged on the columns 93. It will be noticed that when the worm shaft 96 is rotated in one direction then a rotary motion is given by the worms 95 to the worm wheels 91 whereby the jackscrews 90 are moved upward thus raising the support 33 and with it the table 32, the work holder 30 and the work 29 mounted on the said work holder to feed the work to the cutting tools 27 and 28 of the drill spindles 25 and 26. When the worm shaft 96 is rotated in the opposite direction then the support 33 and the parts carried thereby are moved downward to move the work out of engagement with the boring tools 27 and 28.

Variable feed mechanism.

Figures 8, 9:
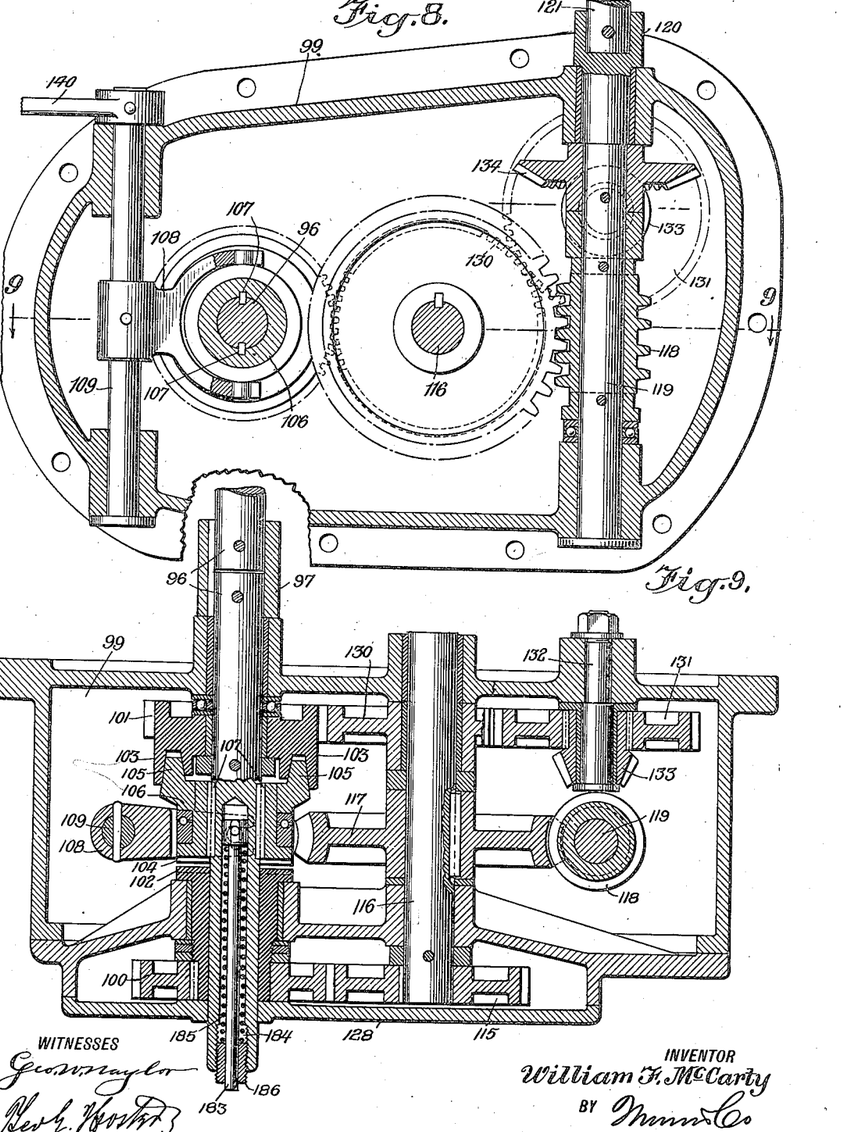
Fig. 8 is an enlarged cross section of the driving mechanism for the raising and lowering device for the work support, the section being on the line 8—8 of Fig. 2.
Fig. 9 is a sectional plan view of the same on the line 9—9 of Fig. 8.
Figures 10, 11:
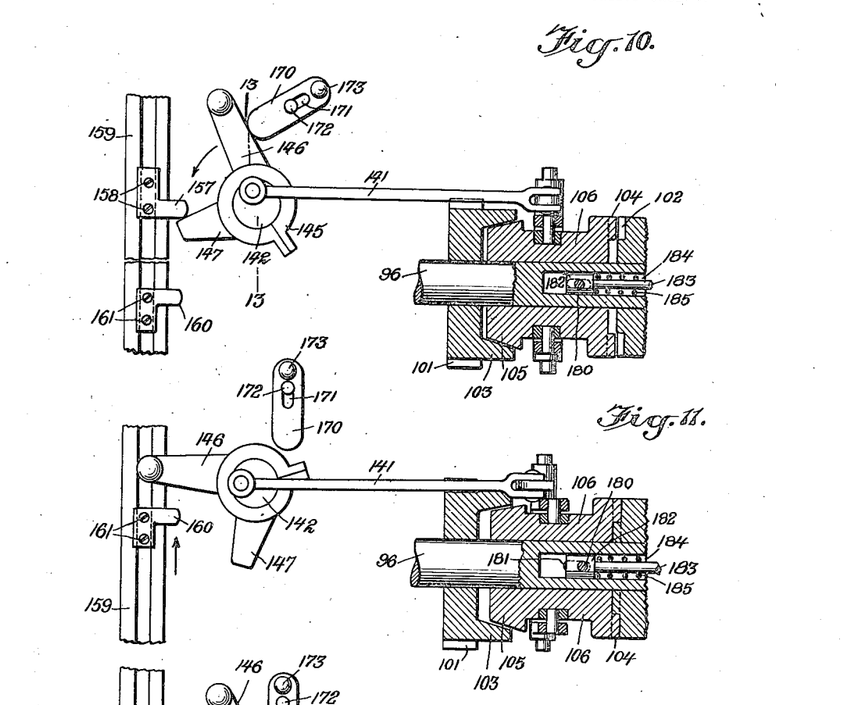
Fig. 10 is an enlarged sectional side elevation of the automatic controlling mechanism for the driving mechanism of the work support and with the parts in neutral position.
Fig. 11 is a similar view of the same with the parts in position for feeding the work support in an upward direction.
Figure 12:
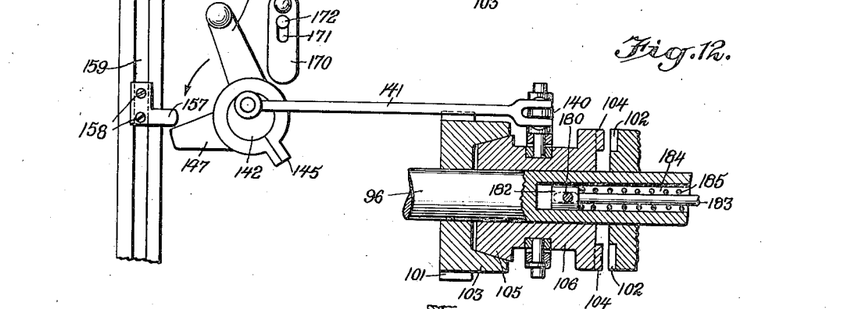
Fig. 12 is a similar view of the same with the parts in position for feeding the work support downward.
Figure 13:
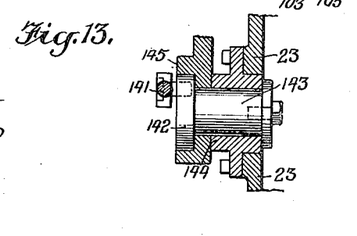
Fig. 13 is a cross section of the same on the line 13—13 of Fig. 10.

The worm shaft 96 is rotated at a slow speed for feeding the support 33 and the parts carried thereby in an upward direction, and the worm shaft 96 is rotated in a reverse direction at a high speed to quickly lower the support 36 and the parts carried thereby. For the purpose mentioned use is made of a variable feed mechanism arranged as follows, special reference being had to Figs. 1, 2, 8 and 9. The right hand end of the worm shaft 96 is preferably made in two parts fastened together by a coupling 97 and the outer section of this worm shaft 96 extends into and is journaled in a housing 99 fastened to the standard 23. Within the housing 99 are arranged two gear wheels 100 and 101, of which the gear wheel 100 is keyed or otherwise removably secured to a clutch member 102 mounted to rotate loosely on the worm shaft 96. The gear wheel 100 is mounted to rotate loosely on the worm shaft 96 and is provided with a clutch member 103, and the said clutch members 102 and 103 are adapted to be engaged by clutch members 104 and 105 of a double clutch 106 connected by keys 107 with the worm shaft 96 to cause the double clutch 106 to rotate the worm shaft and to slide lengthwise thereon with a view to engage the clutch member 104 with the clutch member 102 (see Fig. 11), or to engage the clutch member 105 with the clutch member 103 (see Figs. 9 and 10) or to hold the double clutch 106 in neutral position, that is, with the clutch members 104 and 105 out of engagement with the clutch members 102 and 103, as shown in Fig. 10. The clutch members 102 and 104 are of the jaw type to provide a positive drive for the worm shaft 96 for raising the support 33, while the clutch members 103 and 105 are preferably of the friction type and are used for rotating the worm shaft 96 in a reverse direction for lowering the support 33. The double clutch 106 is shifted by the use of a shifting fork 108 secured on a vertically disposed shaft 109 journaled in the housing 99. The shaft 109 is adapted to be actuated by the attendant in charge of the machine and also automatically by means controlled by the support 33, as hereinafter more fully explained.

The gear wheels 100 and 101 are driven in opposite directions from the main shaft 40 and for this purpose the following arrangement is made: The gear wheel 100 is in mesh with a gear wheel 115 keyed or otherwise detachably secured on a shaft 116 journaled in the housing 99, and on this shaft 116 is secured a worm wheel 117 in mesh with a worm 118 secured on a vertical shaft 119 journaled in the housing 99. The upper end of this shaft 119 is connected by a coupling 120 with an extension shaft 121, the upper end of which is journaled in a housing 122 attached to the upper end of the standard 23, as plainly shown in Figs. 1 and 2. On the extension shaft 121 within the housing 122 is secured a bevel gear wheel 123 in mesh with a bevel gear wheel 124 secured on the outer end of a shaft 125 journaled in the spindle head 24. The inner end of this shaft 125 extends into the housing 44 (see Fig. 6) and is provided at this end with a bevel gear wheel 126 in mesh with the bevel gear wheel 51 previously mentioned. Thus when the shaft 40 is rotated a rotary motion is given to the shafts 125, 121 and 119, of which the latter, by the gearing described, imparts a rotary motion to the gear wheel 100. The gear wheels 100 and 115 are removably mounted on the clutch member 102 and the shaft 116, respectively, to permit of changing the said gear wheels for similar ones of different diameters to correspondingly change the speed at which the worm shaft 96 is to be driven forward by the gearing just described. The removable cover 128 of the casing 99 is adjacent the gear wheels 100 and 115 to permit of making the change in the gear wheels 100 and 115 whenever it is desired to rotate the shaft 96 at a higher or lower speed according to the work in hand at the time.

The gear wheel 101 is in mesh with a gear wheel 130 mounted to rotate loosely on the shaft 116 within the housing 99 (see Figs. 8 and 9), and this gear wheel 130 is in mesh with a gear wheel 131 mounted to rotate loosely on a stud 132 attached to the housing 99. On the gear wheel 131 is keyed or otherwise secured a bevel gear wheel 133 in mesh with a bevel gear wheel 134 secured on the shaft 119, and hence when the latter is rotated a rotary motion is given to the gear wheel 101 by the gearing just described to rotate the said gear wheel 101 at a high speed and in the opposite direction to the gear wheel 100.

*Automatic feed control.*

In order to actuate the double clutch 106, the following arrangement is made, special reference being had to Figs. 1, 2, 10, 11, 12 and 13: On the upper end of the shaft 109 is secured an arm 140 connected by an adjustable link 141 with a crank disk 142 having a shaft 143 journaled in a bearing 144 attached to the front of the standard 23, as plainly shown in Fig. 13. On the crank disk 142 is clamped or otherwise adjustably secured a hub 145 provided with a handled arm 146 and with an arm 147 thus constituting a lever for imparting motion to the link 141 and consequently to the arm 140 with a view to rock the shaft 109 carrying the shifting fork 108. The handled arm 146 is adapted to be operated by the attendant in charge of the machine to turn the crank disk 142 whenever it is desired to move the double clutch 106 from the neutral position, shown in Fig. 10, into the position shown in Fig. 11, to engage the clutch member 104 with the clutch member 102 for raising the support 33 and the parts carried thereby. The arm 147 is adapted to be engaged by a lug 157 adjustably secured by screws 158 in a vertical guideway 159 attached to the front of the support 33. A second lug 160 is arranged below the lug 157 and is likewise adjustably secured by screws 161 or other means in the guideway 159. The lug 160 engages the handle 146 at the time the support 33 moves into its uppermost position whereby the double clutch 106 is shifted from the position shown in Fig. 11 to the position shown in Fig. 12. The shifting of the double clutch 106 disengages the clutch members 104 from the clutch members 102 and moves the clutch member 105 into engagement with the clutch member 103 to reverse the movement of the worm shaft 96 and thus cause the support 33 to move downward. During this downward movement of the support 33 the lug 157 engages the arm 147 to shift the double clutch 106 from the position shown in Fig. 12 into the neutral position illustrated in Fig. 10 whereby the rotation of the worm shaft 96 is stopped and consequently the downward movement of the support 33 ceases at the time the support reaches its lowermost or starting position. The handle arm 146 is adapted to be locked in the normal position shown in Figs. 1, 2 and 10, by the use of a manually controlled catch 170 provided with a slot 171 through which extends a pin 172 attached to the column 23. The catch 170 is provided with a suitable handle 173 adapted to be taken hold of by the operator for moving the catch 170 into angular position, as shown in Fig. 10, that is, to engage the handled arm 146 to prevent the latter from accidentally swinging to the right. When the handle arm 146, is, however, swung downward by the operator from the position shown in Fig. 10 to the position shown in Fig. 11, as previously explained, then the catch 170 by its own gravity swings into a vertical position, that is, out of the path of the handle arm 146 to allow the friction clutch 105 to firmly engage the friction clutch member 103 on the gear wheel 101. It is expressly understood that this catch 170 is only moved into engagement with the handle arm 146 after the double clutch 106 has been moved into neutral position, shown in Fig. 10, by the action of the lug 157 on the arm 147.

The double clutch 106 is engaged by a pin 180 extending through a slot 181 formed in the shaft 96, and the pin 180 engages a head 182 of a rod 183 extending in a bore 184 formed in the right-hand end of the worm shaft 96. A spring 185 is coiled on the rod 183 and presses with one end against the head 102 and abuts with its other end on a plug 186 secured in the outer end of the worm shaft 96, as plainly shown in Fig. 9. The spring 185 tends to press the double clutch 106 from the right to the left to firmly hold the friction clutch member 105 in engagement with the friction clutch member 103, but when the lug 157 engages the arm 147, as previously explained, then the double clutch member 106 is moved outward to the right into neutral position and against the tension of the spring 185. It will further be noticed that when the handle arm 146 is swung downward by the operator, as previously explained, then the spring 185 is further compressed at the time the clutch member 104 moves into engagement with the clutch member 102. It is understood that when the handle arm 146 is swung downward by the operator, the link 141 and the crank disk 142 move into a dead center position one relative to the other (see Fig. 11) thus locking the clutch member 104 of the double clutch 106 in engagement with the clutch member 102. When the lug 160 imparts an upward swinging movement to the handle arm 146 then the movement of the double clutch 106 from the right to the left is facilitated by the action of the spring 185 to engage the friction clutch member 105 firmly with the friction clutch member 103. From the foregoing it will be seen that by the arrangement described the support 33 is started in its upward journey on the operator imparting a downward swinging movement to the handle arm 146 to feed the work to the cutting tools 27 and 28, and when the work has been bored to the desired depth then the double clutch member 106 is automatically shifted from the position shown in Fig. 11 to that shown in Fig. 12 to cause the support 33 to move downward, thereby moving the work out of engagement with the cutting tools 27 and 28, and when the support 33 reaches its lowermost or starting position then the double clutch 106 is again automatically shifted from the position shown in Fig. 11 to that shown in Fig. 12, to cause the support 33 to move downward thereby moving the work out of engagement with the cutting tools 27 and 28, and when the support 33 reaches its lowermost or starting position the double clutch 106 is again automatically shifted from the position shown in Fig. 12 to the neutral position shown in Fig. 10.

*Work holder.*

Figure 4:
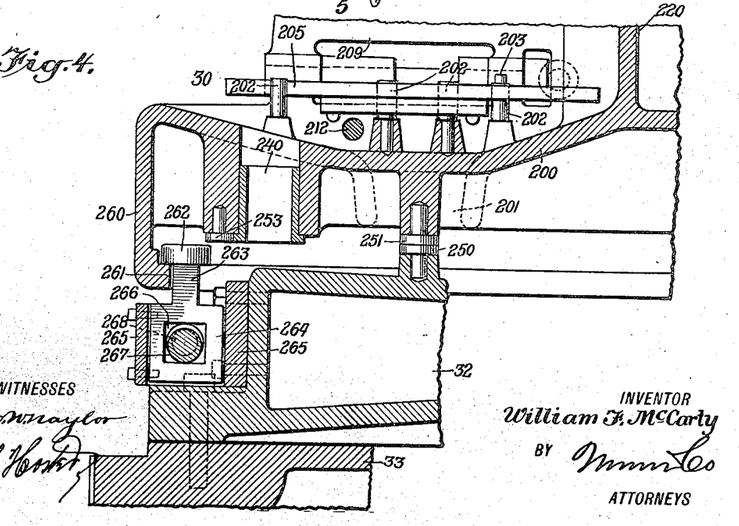
Fig. 4 is an enlarged sectional side elevation of a portion of the support, its table and a portion of the work holder and showing particularly the means for holding the thrust members in engagement.

The work holder 30 is turned by hand after each boring operation, and the work holder shown in the drawings is provided with four stations each adapted to hold a casting 29. One station is at the front of the machine and is the loading station to permit the operator to remove the finished work and replace it by a casting to be bored. The next station to the left is in alinement with the cutting tools 27 for the latter to rough bore the cylinders. The third station is at the rear of the machine and is the cooling station to allow the casting 29 to cool prior to passing to the fourth station, which is to the right and in alinement with the cutting tools 28 for reaming or finishing the cylinders. Thus the cylinders of two castings are bored at the same time, while the casting at the cooling station is allowed to cool and the finished casting at the front or loading station is being removed and replaced by a casting to be bored. The stations of the work holder 30 are alike and hence it suffices to describe but one in detail. Each station is provided with a sloping bottom 200 (see Figs. 4 and 5) provided with spouts 201 for the discharge of the chips and the lubricant, and on the bottom 200 are mounted pins 202 for supporting the casting 29 a distance above the bottom 200. Sundry of the pins 202 are provided with reduced upper ends 203 adapted to pass into openings in the body of the casting to hold the latter against accidental shifting. In order to facilitate the placing of the casting 29 in position on the pins 202 use is made of two parallel spaced rails 205 mounted on the inner ends of bell crank levers 206 mounted to swing on transverse shafts 207 journaled in suitable bearings 208 arranged on side walls or partitions 209 forming the sides of each station and being integral parts of the work holder 30. The outer ends of the bell crank levers 206 are provided with cam members 210 engaging cam members 211 secured on the ends of a shaft 212 journaled in the lower portions of the partitions 209 below the supporting pins 202. One of the cam members 211 is provided with a handle 213 under the control of the operator to permit of turning the shaft 212 with a view to impart a swinging motion to the bell crank levers 206 to raise the rails 205 above the supporting pins 202. When the rails are moved into this position at the front station of the work holder they lift the finished casting off the pins 202 to allow the operator to conveniently slide the casting off the rails and from the work holder and to permit the operator to place another casting to be bored in position on the said rails. When this has been done, the handle 213 is swung back from its horizontal into a vertical position thus lowering the casting onto the pins 202.

Each station is provided with a back wall 220 provided at its front face with a boss 221 in which is adjustably held a stop screw 222 for limiting the rearward movement of the casting 29 when sliding the latter on to the rails 205 at the time the latter are in uppermost position. Each station is provided at the top of the partitions 209 with hook levers 225 having their ends 226 journaled in suitable bearings 227 arranged on the top of the partitions 209. The hook levers 225 are adapted to hook on to the top of the casting 29 and bear down on the same to securely hold the casting in position on the supporting pins 202. The hook levers 225 are provided with outwardly extending arms 228 engaged by cams 229 formed on the fulcrum ends of hand levers 230 fulcrumed at 231 on the partitions 209. Each hand lever 230 is provided with a locking pin 232 adapted to engage either one of two apertures 233 formed in the corresponding partition 209 to lock the hand lever 230 in upper or in lower position. When the hand lever 230 is in upper position its cam 229 is in released position relative to the arm 228 of the corresponding hook lever 225 to hold the latter in uppermost position by the overbalancing weight of its arm 228. When the hook lever 225 is in uppermost position the casting 29 can be readily removed from the rails 205 or replaced thereon, and after the casting has been lowered on to the pins 202, as above explained, then the operator swings the hand levers 230 downward to cause the cams 229 to impart a downward swinging movement to the hook levers 225 to engage the latter with the top of the casting to securely hold the latter in place.

*Locking means for the work holder.*

The work holder 30 is locked against accidental rotation during the time the unloading, loading and boring operations are carried on, and for this purpose the bottom 200 of each station is provided with a bushing 240 (see Figs. 3 and 4) each adapted to register with a bushing 241 formed in the front of the table 32, and in this bushing 241 is mounted to slide a locking bolt 242 adapted to pass into the bushing 240 to lock the work holder 30 against rotation for the time being. The lower end of the locking bolt 242 is pivotally connected with an arm 243 secured on the inner end of a shaft 244 journaled in a suitable bearing 245 forming part of the table 32. On the outer end of the shaft 244 is secured a handle 246 under the control of the operator standing in front of the machine to permit the operator to move the bolt 242 into or out of engagement with the bushing 240. It is understood that prior to giving the work holder 30 a quarter turn, the bolt 242 is retracted and after the work holder 30 has been given a quarter turn then the bolt 240 is again moved in engagement with the bushing 240 to hold the work holder against accidental turning for the time being. The handle 246 is provided with a retaining pin 247 (see Fig. 3) adapted to engage an aperture in the bearing 245 to hold the handle 246 in locked position during the time the bolt 242 is in engagement with the bushing 240. Pointers 248, one for each station, are arranged on the peripheral face of the work holder 30, and each pointer is adapted to register with a positioning pointer 249 secured to the table 32 at the front thereof (see Fig. 1).

*Alinement means for the work holder.*

The table 32 is provided at opposite sides of the central ball bearing 31 with thrust or supporting members 250 (see Figs. 4 and 5), preferably in the form of hardened steel buttons, adapted to be engaged by similar thrust members 251 arranged on the under side of the work holder 30, it being understood that the thrust members 251 are arranged in a circle and spaced apart so that the two diametrically opposite thrust members 251 register at the time with the thrust members 250 on the table 32. Thrust members 252 are arranged at the front and rear of the table 32 and are adapted to be engaged by thrust members 253 attached to the under side of the work holder 30 at the middle of each station to support the work holder at the front and rear thereof (see Fig. 5.)

In order to firmly engage the registering thrust members 251 with the thrust members 250 and the thrust members 253 with the thrust members 252, use is made of clamping means arranged as follows: The rim 260 of the work holder 30 is provided at its lower end with an inwardly extending cam flange 261 adapted to be engaged at the top by a head 262 held on the upper end of a shank 263 extending upwardly from a slide or crosshead 264 mounted to slide up and down in suitable bearings 265 arranged on the corresponding side of the table 32. The slide 264 is provided with an opening 266 in which fits an eccentric 267 secured or formed on a transverse shaft 268 journaled on the bed 32. On the forward end of the shaft 268 is secured a handle 269 under the control of the operator for turning the shaft 268 with a view to rotate the eccentric 267 and thereby move the slide 264 down or up according to the direction in which the handle 269 is turned at the time. Normally the slide 264 is in uppermost position with the head 262 slightly above the flange 261 to allow convenient turning of the work holder 30. After the work holder 30 is locked in place by the bolt 242, as previously explained, then the operator actuates the handles 269 to cause the eccentrics 267 to move the slides 264 downward thus causing the heads 262 to bear down on the flange 261 whereby the registering thrust members 251 are moved in firm contact with the thrust members 250. It will be noticed that when this takes place a firm bearing for the sides of the work holder is provided to insure true boring of the cylinders by the boring tools 27 and 28. After the cylinders have been bored and the support 33 returned to lowermost position then the operator moves the handles 269 back to normal position to raise the slides 264 and their heads 262 to unclamp the sides of the work holder 30 to allow easy turning of the work holder after the latter is unlocked by the bolt 242. Each handle 269 is provided with a locking pin 270 engaging either of two apertures to hold the handle in the position it is moved into at the time.

*Oiling system.*

Figure 7:
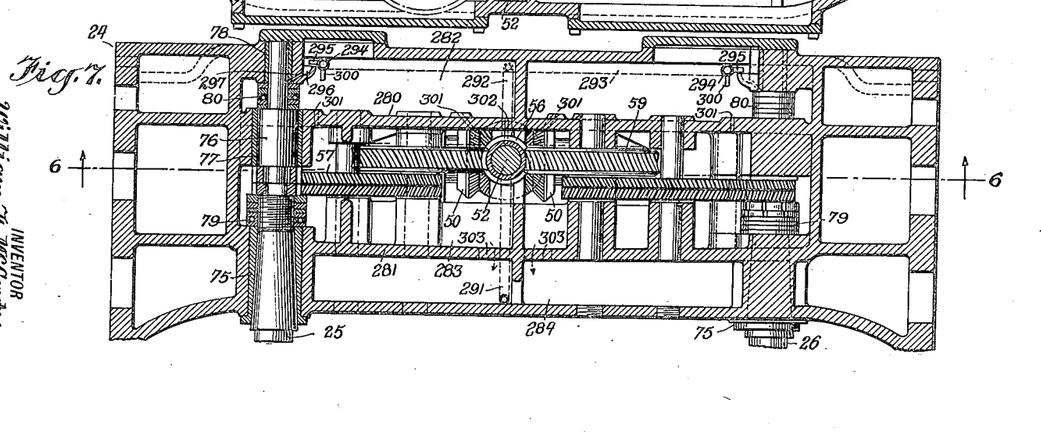
Fig. 7 is a sectional side elevation of the same on the line 7—7 of Fig. 6.

The feed changing mechanism located in the housing 99 is lubricated by the splash system, that is, the housing is filled with liquid lubricant readily taken up by the various movable members in the housing. The spindle driving mechanism mounted in the spindle head 24 is lubricated by an oiling system arranged as follows: The spindle head 24 is provided with an upper partition 280 and a lower partition 281 thus providing three compartments 282, 283 and 284, of which the latter forms an oil well, while the compartment 283 contains the spindle driving mechanism, and the top compartment 282 is the oil distributing compartment. A pump 290, preferably of the rotary type, is mounted on the rear end of the shaft 52 (see Fig. 6) outside of the housing 44, and the suction pipe 291 of this pump 290 extends into the bottom compartment or oil well 284, as plainly shown in Fig. 7. The discharge pipe 292 of the pump 290 connects with a pipe 293 provided with branch pipes 294 extending transversely within the upper portion of the top compartment 282. The branch pipes 294 are provided with horizontally disposed discharge nozzles 295, each discharging into a trough 296 formed on the corresponding bearing 78 of the extension 76 on the boring spindle 25, and each trough 296 is provided with a downwardly inclined aperture 297 discharging lubricant into the corresponding bearing 78. By the arrangement described, the several boring spindles are continually lubricated. The pipes 294 are further provided with downwardly extending discharge nozzles 300 discharging oil into the compartment 282 to flow through openings 301 formed in the partition 280 into the middle compartment 283 and onto the trains of gear wheels 57, 58 and 59 at the point of mesh between any two gear wheels of the said trains of gear wheels 57, 58 and 59. Openings 302 are formed in the partition 280 and lead to the bearings 53 to properly lubricate the worm shaft 52. The bottom partition 281 is provided with openings 303 to allow the oil to flow from the compartment 283 into the bottom compartment 284 from which oil is pumped back through the suction pipe 291, pump 290 and the discharge pipes 292, 293 and 294 into the upper compartment 282, for distribution therein, as above explained. A gage 304 (see Figs. 1 and 2) is connected with the compartment 284 to indicate the height of the lubricant.

Figure 15:
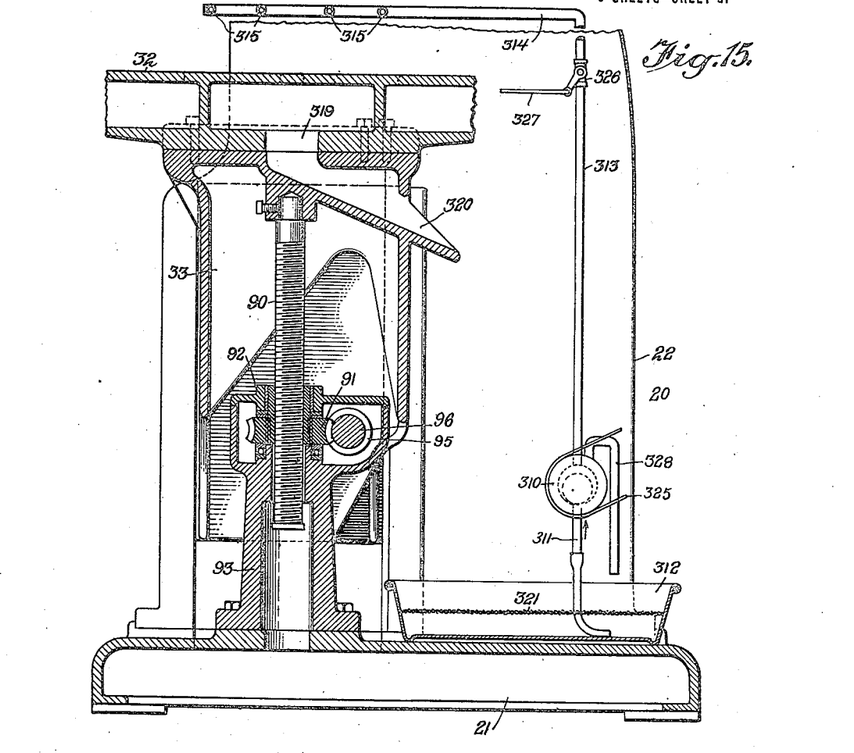
Fig. 15 is an enlarged cross section of the work support and the means for raising and lowering it.

In order to cool the work and the boring tools at both sides of the machine use is made of a pump 310 having a suction pipe 311 extending into the bottom of a pan 312 adapted to contain a cooling liquid such as a solution of water and soda. The pump 310 is provided with a discharge pipe 313 connected with branch pipes 314 having nozzles 315 delivering the liquid to the boring tools 27 and 28, and the upper ends of the cylinders in the castings 29 bored at the time. The liquid and the chips incident to the boring operation pass from the lower open ends of the cylinders onto the inclined bottoms 200 and by way of the spouts 201, through openings 316 formed in depressions 317 arranged on the top 318 of the table 32, which latter is made hollow and provided in its bottom with an opening 319 (see Fig. 15) which leads to a chute 320 formed in the support 33. This chute 320 extends downwardly and rearwardly and delivers the chips and liquid to the pan 312, which latter is provided with a screen 321 to retain the chips while the liquid passes through the screen into the lower portion of the pan 312 to be sucked up by the pump 310, as previously explained. It will be noticed that by the arrangement described the liquid for the boring tools and the cylinders is used over and over again. The pump 310 is preferably mounted on the column 22 and is driven by a belt 325 or other means from other machinery. The discharge pipe 313 is provided with a valve 326 (see Fig. 15) controlled by a handled rod 327 slidably mounted on the column 22 and extending within reach of the operator at the front of the machine to allow the operator to shut the valve 326 whenever the machine is not in use. The pump 310 is provided with an auxiliary discharge pipe 328 discharging into the pan 312 at the time the valve 326 is in closed position and the pump is still running.

The operation is as follows:

When the machine is in use, four castings 29 are in position on the work holder 30 at the time, that is, the casting at the front or loading and unloading station is the finished one and is removed by the operator in charge of the machine and replaced by a casting 29 to be bored. Two castings are at the two side stations, of which one is rough bored by the boring tools 27 while the other casting is reamed or finished by the boring tools 28, and the third casting at the rear station is cooling during the time the work holder 30 is at rest and while the boring operations are carried on. It is understood that normally the support 33 with the bed 32, work holder 30 and the castings 29 mounted thereon as described is in lowermost position and after the work holder 30 has been locked against rotation by the locking bolt 242 the thrust members 251 and 253 engage the thrust members 250 and 252, respectively, as previously explained, then the operator imparts a downward swinging movement to the arm 146 to move the latter from the position shown in Figs. 1, 2 and 10 to the position shown in Fig. 11, whereby the double clutch 106 is moved from neutral position into driving engagement with the gear wheel 100 to cause the support 33 and the parts carried thereby to move upwardly. In doing so, the two castings at the sides of the machine are moved into engagement with the boring tools 27 and 28 rotated continually by the spindle driving mechanism above explained. As soon as the cylinders in the two castings at the sides are bored, that is, at the time the support 33 moves into uppermost position, then the lug 160 engages the arm 146 and swings the latter upward whereby the double clutch 106 is moved from the position shown in Fig. 11 into the position shown in Fig. 12, to rotate the worm shaft 96 in a reverse direction whereby moving the support 33 and the parts carried thereby downward until the cylinders of the castings pass out of the boring tools 27 and 28. When this position is reached, the lug 157 engages the arm 147 whereby the double clutch 106 is moved from the position shown in Fig. 12 back into neutral position, shown in Fig. 10, thus stopping rotation of the shaft 96 and thereby causing the support 33 to come to rest. As soon as the support 33 has reached its lowermost position, the handles 269 are actuated to allow the sides of the work holder 30 to spring back to uppermost position, and then the operator actuates the handle 246 to retract the bolt 242 thus unlocking the work holder 30. During the aforesaid boring operation the attendant in charge of the machine removes the previously bored casting at the front station and replaces the same by another casting to be bored. The work holder 30 is now given a quarter turn so that the rough bored casting at the left-hand side of the machine moves to the rear while the finished casting at the right moves to the front to be replaced by another casting, while the castings at the loading station pass to the position to the left in alinement with the boring tools 27 and the cooled casting at the rear of the machine passes into registering position with the boring tools 28. The above described operation is then repeated, that is, the work holder is locked in place against turning, its sides are clamped, and the arm 146 is again swung downward by the operator to start the upward feeding of the support 33 and the parts carried thereby.

From the foregoing it will be seen that by the arrangement described, the finished casting is quickly removed and replaced by a new one, one casting is rough bored while at the same time another one is reamed or finished. It will also be noticed that after the operator has started the feed mechanism he is at liberty to devote his time to removing the previously bored casting and replacing it by a new one, as no attention is required by the attendant until the boring operation is completed and the support 33 with the parts carried thereby have returned to starting position.

Figure 16:
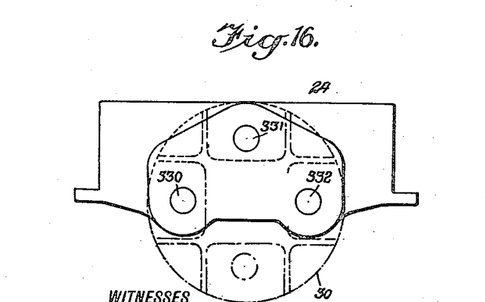
Fig. 16 is a reduced plan view of a modified form of spindle head.
Figure 17:
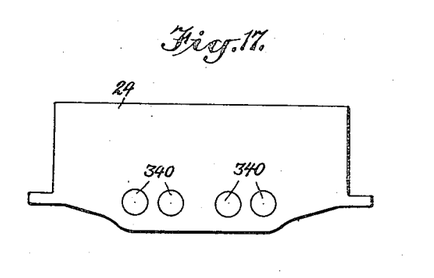
Fig. 17 is a similar view of another modified form of the spindle head.

The boring machine has been shown and described with the spindles 25 and 26 arranged for boring two sets of cylinders at a time, with the cylinders in each set cast *en bloc*, but I do not limit myself to this particular arrangement of the spindles as the same may be differently arranged. For instance, as shown in Fig. 16, the spindle head 24 may be provided with three spindles 330, 331 and 332 of which the spindles 330 and 332 are arranged at the sides while the spindle 331 is arranged at the rear. The spindle 330 is used for rough boring a cylinder, the spindle 331 is used for semi-finishing the cylinder, and the spindle 332 is used for reaming or finishing the cylinder. A four-station work holder 30, as above described, is used with this arrangement of spindles, it being, however, understood that instead of allowing the casting to cool at the rear of the machine, it is semi-finished by the spindle 331. If desired the spindle head 24 may be arranged with a series of spindles 340 arranged in a row, as shown in Fig. 17, for boring four cylinders at a time whether arranged as single units or cast *en bloc*. In this case it is not necessary to provide a revoluble work holder, but such may be used for loading and unloading purposes while the boring operations are carried on.

Having thus described my invention, I claim as new and desire to secure by Letters Patent:—

1. A boring machine, comprising a support mounted to slide up and down and supporting a work holder, a raising and lowering means for the said support and including a clutch shaft, two clutch members loose on the said clutch shaft, a double clutch member mounted to slide on and to rotate with the said clutch shaft and adapted to engage either of the said loose clutch members, slow speed driving means connected with one of the loose clutch members, high speed driving means connected with the other loose clutch member, a shifting device for the said double clutch member including a shifting lever, a link connected with the shifting lever, a hand lever having an arm and a crank, of which the latter is connected with the said link, and lugs moving with the said support and adapted to engage the said hand lever arm.

2. A boring machine, comprising a support mounted to slide up and down and supporting a work holder, a raising and lowering means for the said support and including a clutch shaft, two clutch members loose on the said clutch shaft, a double clutch member mounted to slide on and to rotate with the said clutch shaft and adapted to engage either of the said loose clutch members, slow speed driving means connected with one of the loose clutch members, high speed driving means connected with the other loose clutch member, a shifting device for the said double clutch member including a shifting lever, a link connected with the shifting lever, a hand lever having an arm and a crank, of which the latter is connected with the said link, lugs moving with the said support and adapted to engage the said hand lever arm, and a spring device connected with the said double clutch member and tending to move the double clutch member into engagement with the said high speed loose clutch member.

3. A boring machine, comprising a support mounted to slide up and down and supporting a work holder, a raising and lowering means for the said support and including a clutch shaft, two clutch members loose on the said clutch shaft, a double clutch member mounted to slide on and to rotate with the said clutch shaft and adapted to engage either of the said loose clutch members, slow speed driving means connected with one of the loose clutch members, high speed driving means connected with the other loose clutch member, a shifting device for the said double clutch member including a shifting lever, a link connected with the shifting lever, a hand lever having an arm and a crank, of which the latter is connected with the said link, lugs moving with the said support and adapted to engage the said hand lever arm, and a spring device connected with the said double clutch member and tending to move the double clutch member into engagement with the said high speed loose clutch member, the said link and crank connection when in dead center position holding the double clutch member in locking engagement with the said low speed loose clutch member and against the tension of the said spring device.

4. A boring machine, comprising a support adapted to be raised and lowered, a revoluble work holder mounted on the said support and provided with a plurality of stations for the work, a fixed spindle head above the work holder, a set of boring spindles mounted on the said spindle head and adapted to rough bore the work while at rest at the said boring spindles, a second set of boring spindles mounted on the said head and adapted to finish bore the work while at rest at the said second set of boring spindles, means for locking the said work holder to the said support to hold the work holder against rotation during the boring operation, sets of coacting thrust taking-up members mounted on the support and on the work holder and normally out of engagement, the said members when in engagement supporting the work holder intermediate its axis and its periphery, means for imparting a downward clamping motion to the work holder at opposite sides below the said sets of spindles to move the thrust taking-up members into engagement, and raising and lowering means for moving the said support and with it the work holder up and down and while the work holder is locked to the support and the thrust members are in engagement.

5. In a boring machine, a support, a work holder mounted to rotate centrally on the said support, the work holder having an unsupported rim, thrust members on opposite sides of the center of the said support, thrust members arranged in a circle on the said work holder and adapted to register with the said thrust members on the said support, and pressure means under the control of an operator and exerting a downward pressure on the said rim to move the said work holder thrust members into contact with the support thrust members.

6. In a boring machine, a support, a work holder mounted to rotate centrally on the said support, the work holder having an unsupported rim, thrust members on opposite sides of the center of the said support, thrust members arranged in a circle on the said work holder and adapted to register with the said thrust members on the said support, and manually controlled pressure means engaging the rim of the work holder and arranged in radial alinement with the thrust members on the support to pull the sides of the rim downward and to engage the registering work holder thrust members with the said support thrust members.

7. In a boring machine, a support, a work holder mounted to rotate centrally on the said support, the work holder having an unsupported rim, thrust members on opposite sides of the center of the said support, thrust members arranged in a circle on the said work holder and adapted to register with the said thrust members on the said support, an inwardly extending annular flange on the under side of the said rim, members adapted to engage the said flange and mounted to slide up and down on the said support, the said pressure members being in radial alinement with the said support thrust members, and eccentrics mounted on the support under the control of an operator, the eccentrics engaging the said pressure members to pull the sides of the work holder downward to engage the registering work holder and thrust members with the support thrust members.

8. In a boring machine, a work holder provided with supporting means mounted on the said work holder for the work to rest on, auxiliary means adapted to initially receive and temporarily support the work and to lower the latter onto the said supporting means, and means controlled by an operator and mounted on the said work holder and engaging the said auxiliary means to raise and lower the latter.

9. In a boring machine, a work holder provided with a plurality of supporting pins for the work to rest on, rails adapted to initially receive and temporarily support the work above the said pins and to lower the work onto the pins, and actuating means controlled by an operator and mounted on the said work holder, the said actuating means engaging the said rails to raise and lower the latter.

10. In a boring machine, a work holder provided with a plurality of supporting pins for the work to rest on, parallel rails arranged adjacent sundry of the said pins and adapted to receive and temporarily support the work above the pins and to lower work onto the pins, a rock shaft journaled on the said work holder and extending at an angle to the said rails, levers fulcrumed on the work holder and supporting the said rails, and cams turning with the said shaft and engaging the said levers to actuate the latter to raise and lower the said rails.

11. In a boring machine, a work holder provided with a plurality of supporting pins for the work to rest on, parallel rails arranged adjacent sundry of the said pins and adapted to receive and temporarily support the work above the pins and to lower the work onto the pins, a rock shaft journaled on the said work holder and extending at an angle to the said rails, levers fulcrumed on the work holder and supporting the said rails, the said levers having cam members, a handle on one end of the said shaft and provided with a cam member engaging the cam member on one of the said levers, and a cam on the other end of the shaft and engaging the cam on the other lever.

12. In a boring machine, a work holder provided with supporting means for the work, hook levers fulcrumed on the work holder and adapted to hook onto the top of the work to hold the latter against movement on the said supporting means, the said hook levers having outwardly extending arms and hand levers fulcrumed on the said work holder and provided at their pivotal ends with cams engaging the arms of the said hook levers to actuate the latter.

13. In a boring machine, a frame, a support mounted to slide up and down on the said frame and provided on top with a table, the latter having a cooling liquid receiving chamber and the support having a spout connected with the said liquid receiving chamber to allow the liquid to flow from the latter onto and down the spout, a work holder mounted on the said table and having a depression and work supporting means at the depression to support the work, the said depression having in its bottom a nozzle discharging into the said liquid receiving chamber of the table, and a pump delivering a cooling liquid to the work, the liquid passing from the work by way of the said depression to the liquid receiving chamber and from the latter to the spout.

14. In a boring machine, a frame, a support mounted to slide up and down on the said frame and provided on top with a table, the latter having a cooling liquid receiving chamber and the support having a spout connected with the said liquid receiving chamber to allow the liquid to flow from the latter onto and down the spout, a work holder mounted on the said table and having a depression and work supporting means at the depression to support the work, the said depression having in its bottom a nozzle discharging into the said liquid receiving chamber of the table, a pump delivering cooling liquid to the work, the liquid passing from the work by way of the said depression to the liquid receiving chamber and from the latter to the spout, and a pan having a screen onto which discharges the said spout, the suction pipe of the said pump extending into the said pan below the screen.

WILLIAM F. McCARTY.